(12) United States Patent
Kim et al.

(10) Patent No.: US 9,229,591 B2
(45) Date of Patent: Jan. 5, 2016

(54) TOUCH PANEL

(71) Applicant: LG INNOTEK CO., LTD., Seoul (KR)

(72) Inventors: Byung Soo Kim, Seoul (KR); Keun Sik Lee, Seoul (KR); Ji Won Jo, Seoul (KR); Hyuk Jin Hong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 232 days.

(21) Appl. No.: 13/744,829

(22) Filed: Jan. 18, 2013

(65) Prior Publication Data

US 2013/0181925 A1  Jul. 18, 2013

(30) Foreign Application Priority Data

Jan. 18, 2012 (KR) .................. 10-2012-0005610

(51) Int. Cl.
*G06F 3/041* (2006.01)
*G06F 3/044* (2006.01)

(52) U.S. Cl.
CPC ........... *G06F 3/044* (2013.01); *G06F 3/041* (2013.01); *G06F 2203/04103* (2013.01)

(58) Field of Classification Search
CPC .............................. G06F 3/044; G06F 3/041
USPC ................................................ 345/173–175
See application file for complete search history.

(56) References Cited

U.S. PATENT DOCUMENTS

2010/0139955 A1* 6/2010 Long et al. ............... 174/257
2013/0021724 A1* 1/2013 Chan et al. ............ 361/679.01

FOREIGN PATENT DOCUMENTS

KR  10-2010-0102950 A  9/2010

OTHER PUBLICATIONS

Office Action dated May 28, 2013 in Korean Application No. 10-2012-0005610, filed Jan. 18, 2012.

* cited by examiner

*Primary Examiner* — Amare Mengistu
*Assistant Examiner* — Sarvesh J Nadkarni
(74) *Attorney, Agent, or Firm* — Saliwanchik, Lloyd & Eisenschenk

(57) ABSTRACT

Disclosed is a touch panel. The touch panel includes a sensing electrode pattern layer on a transparent substrate; a wire connected to the sensing electrode pattern layer; a bonding pad formed at an end of the wire and connected to a flexible printed circuit board (FPCB); and an adhesive insulating layer on one surface of the sensing electrode pattern layer and on a region except for the bonding pad, wherein the adhesive insulating layer comprises a first adhesive insulating layer and a second adhesive insulating layer, and an area of the first adhesive insulating layer is different from an area of the second adhesive insulating layer.

7 Claims, 3 Drawing Sheets

TOUCH PANEL

CROSS-REFERENCE TO RELATED APPLICATION

This application claims the benefit under 35 U.S.C. §119 of Korean Patent Application No. 10-2012-0005610, filed Jan. 18, 2012, which is hereby incorporated by reference in its entirety.

TECHNICAL FIELD

The embodiment relates to a touch panel. More particularly, the embodiment relates to a touch panel, which can be formed without a separate patterning process to expose a bonding pad.

BACKGROUND ART

A touch panel including an input unit (pointing device) has been extensively used in displays of electronic devices such as personal digital assistants (PDA), a notebook computer, office automation (OA) device, a medical device, or an automobile navigation system. For example, the touch panel including a capacitive touch panel as well as a resistive touch panel, an electromagnetic induction touch panel, and an optical touch panel is generally known.

In general, the capacitive touch panel is classified into an analog type and a digital type.

Since the analog touch panel includes a sheet type sensor electrode, a pattern is not required on a sensing region. However, the digital touch panel requires a pattern for a sensor electrode in the sensing region. The digital capacitive touch panel induces a current to confirm a touch location based on variation in capacitance caused by electrostatics of a human body and a transparent electrode. For example, in order to detect a location in the touch panel touched by a finger or a stylus, various technologies for the capacitive touch panel have been developed.

FIG. 1 is an exploded perspective view illustrating a touch panel according to the related art, and FIG. 2 is a view illustrating the touch panel according to the related art.

In general, as shown in FIGS. 1 and 2, two sensing electrode pattern layers 120 and 140 capable of sensing capacitance are provided on a transparent substrate 110.

The two capacitive sensing electrode pattern layers 120 and 140 are spaced apart from each other while interposing an insulation material layer 130 therebetween to obtain a capacitive effect between the layers, and another insulation material layer or a passivation layer 150 is formed on the capacitive sensing electrode pattern layers 120 and 140. According to the related art, in order to insulate the sensing electrode pattern layers 120 and 140 of the touch panel, an insulator is coated on entire surfaces of the sensing electrode pattern layers 120 and 140 to form the insulation material layer 130.

Therefore, according to the related art, it is difficult to remove an insulating material of a bonding pad 135 formed at an end of a wire connected to the sensing electrode pattern layers. Since a thickness of the insulation material layer 130 is greater than a thickness of the wire, step difference occurs in the wire of each sensing electrode pattern layer.

DISCLOSURE

Technical Problem

The embodiment provides a touch panel, which can be formed without a separate patterning process for exposing a bonding pad connected to a wire of an Rx sensing electrode or a wire of a TX sensing electrode by inhibiting an adhesive insulating layer from being formed on the bonding pad.

Technical Solution

According to the embodiment, there is provided a touch panel including: a sensing electrode pattern layer on a transparent substrate; a wire connected to the sensing electrode pattern layer; a bonding pad formed at an end of the wire and connected to a flexible printed circuit board (FPCB); and an adhesive insulating layer on one surface of the sensing electrode pattern layer and on a region except for the bonding pad, wherein the adhesive insulating layer comprises a first adhesive insulating layer and a second adhesive insulating layer, and an area of the first adhesive insulating layer is different from an area of the second adhesive insulating layer.

According to another embodiment, the sensing electrode pattern layer may include: a first sensing electrode pattern layer; and a second sensing electrode pattern layer on the first sensing electrode pattern layer, wherein the wire comprises: a first wire aligned on a same plane with the first sensing electrode pattern layer and connected to the first sensing electrode pattern layer; and a second wire aligned on a same plane with the second sensing electrode pattern layer and connected to the second sensing electrode pattern layer, and wherein the bonding pad may include a first bonding pad disposed on a same plane with the first sensing electrode pattern layer and formed at an end of the first wire; and a second bonding pad disposed on a same plane with the second sensing electrode pattern layer and formed at an end of the second wire.

According to another embodiment, the first adhesive insulating layer may be formed on a region except for the first bonding pad, and the second adhesive insulating layer may be formed on a region except for the second bonding pad.

According to another embodiment, the first adhesive insulating layer may be funned on the first sensing electrode pattern layer and the first wire, and the second adhesive insulating layer may be formed on the second sensing electrode pattern layer and the second wire.

According to another embodiment, the first adhesive insulating layer may be formed at a region corresponding to the second sensing electrode pattern layer, the second wire, and the second bonding pad, and the second adhesive insulating layer may be formed at a region corresponding to the first sensing electrode pattern layer.

According to another embodiment, the first adhesive insulating layer may be formed on the first sensing electrode pattern layer, and the second adhesive insulating layer may be formed on the second sensing electrode pattern layer and the second wire.

According to another embodiment, the first adhesive insulating layer may be formed at a region corresponding to the second sensing electrode pattern layer, the second wire, and the second bonding pad, and the second adhesive insulating layer may be formed at a region corresponding to the first sensing electrode pattern layer and the first wire.

According to another embodiment, the first adhesive insulating layer and the second adhesive insulating layer may be formed on a region except for the first bonding pad or the second bonding pad.

According to another embodiment, the first adhesive insulating layer may be formed on the first sensing electrode pattern layer, the first wire, and the first bonding pad, and the second adhesive insulating layer may be formed on the second sensing electrode pattern layer and the second wire.

According to another embodiment, the first adhesive insulating layer may be formed at a region corresponding to the second sensing electrode pattern layer and the second wire, and the second adhesive insulating layer may be formed corresponding to the first sensing electrode pattern layer and the first wire.

Advantageous Effects

According to the embodiment, a touch panel can be formed without a separate patterning process for exposing a bonding pad connected to a wire of an Rx sensing electrode or a wire of a TX sensing electrode by inhibiting an adhesive insulating layer from being formed on the bonding pad.

According to the embodiment, the process can be optimized by selectively forming the adhesive insulating layer on the bonding pad such that the bonding pad can be exposed when it is necessary for the process.

According to the embodiment, the step difference between the wires of the sensing electrode pattern layers due to the adhesive insulating layer having the relatively thick thickness can be inhibited by removing the adhesive insulating layer from the wire.

BEST MODE FOR INVENTION

Figure 1:
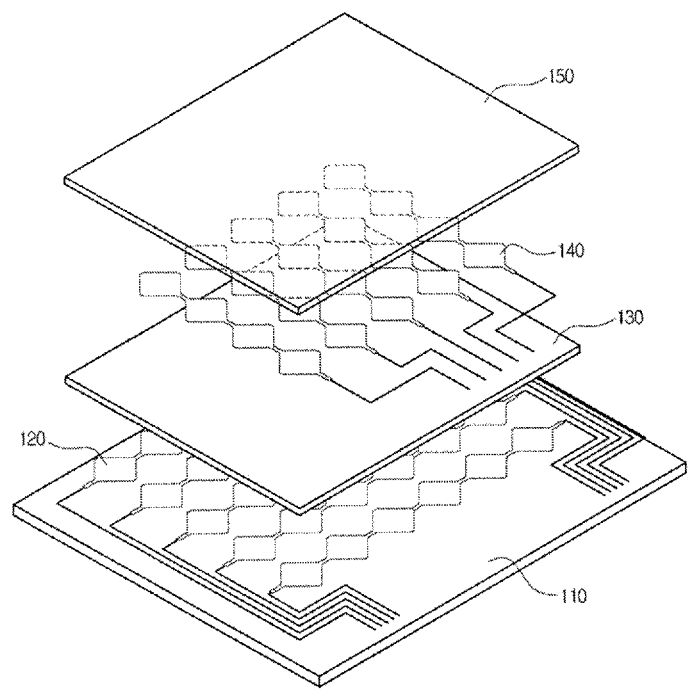
FIG. 1 is an exploded perspective view illustrating a touch panel according to the related art.
Figure 2:
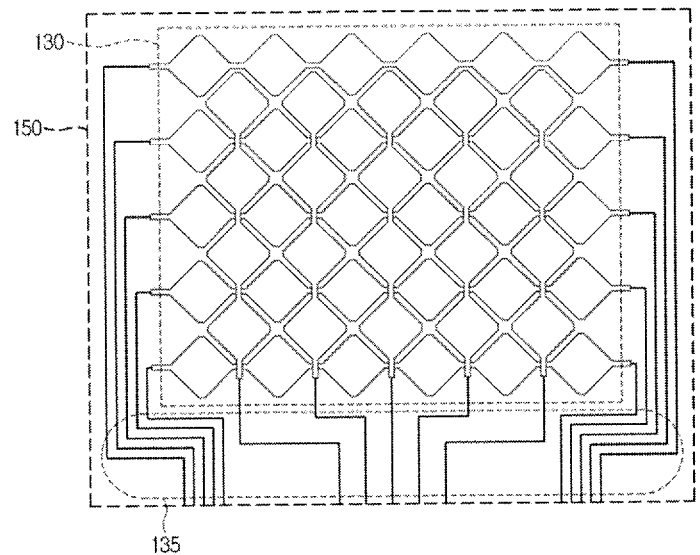
FIG. 2 is a view illustrating the touch panel according to the related art.

Hereinafter, a touch panel according to the exemplary embodiment will be described in detail with reference to accompanying drawings. In a description of the embodiment, if the function or the structure related to the disclosure and generally known to those skilled in the art make the subject matter of the disclosure unclear, the details of the function or the structure will be omitted. The size of the elements shown in the drawings may be exaggerated for the purpose of explanation and may not utterly reflect the actual size.

The touch panel according to the embodiment will be described with reference to FIG. 3.

Figure 3:
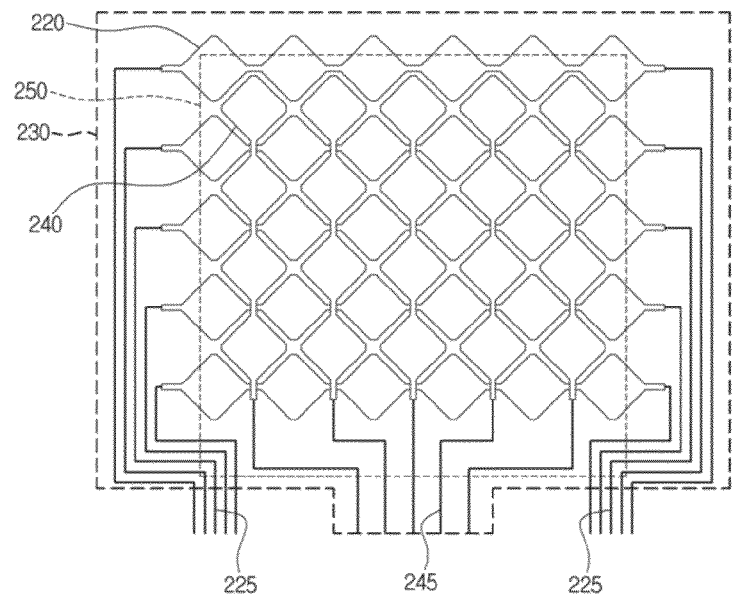
FIG. 3 is a view illustrating a touch panel according to a first embodiment.

FIG. 3 is a view illustrating a touch panel according to an embodiment.

Referring to FIG. 3, the touch panel according to the embodiment includes a first sensing electrode pattern layer 220 formed on a transparent substrate defined by an effective area and an ineffective area, a first adhesive insulating layer 230 formed on the first sensing electrode pattern layer 220, a second sensing electrode pattern layer 240 formed on the first adhesive insulating layer 230, and a second adhesive insulating layer 250 formed on the second sensing electrode pattern layer 240. The touch panel according to the embodiment includes a first wire connected to the first sensing electrode pattern layer 220 and a second wire connected to the second sensing electrode pattern layer 240.

The transparent substrate includes glass or plastic. The transparent substrate is defined by the effective area on which a sensing electrode and an ineffective area on which a wire is formed. That is, according to the embodiment, the effective area refers to an area to which a touch command of a user may be inputted. To the contrary to the effective area to which the touch command of the user can be input, the ineffective area signifies an area to which the touch command is not input because the ineffective area is not activated even if the touch of the user is input thereto.

That is, the effective area may be provided therein with the first sensing electrode pattern layer 220 and the second sensing electrode pattern layer 240, and the ineffective area may be provided therein with the first wire, the second wire, a first bonding part, and a second bonding part.

The first sensing electrode pattern layer 220 and the second sensing electrode pattern layer 240 may include at least one of indium tin oxide (ITO), indium zinc oxide (IZO), zinc oxide, a carbon nano-tube (CNT), an Ag Nano wire, a conductive polymer, and a grapheme on the transparent substrate. The first adhesive insulating layer 230 and the second adhesive insulating layer 250 may include an optically clear adhesive (OCA) film.

Hereinafter, the touch panel according to the embodiment configured as above will be described in detail.

According to the touch panel of the first embodiment, the first sensing electrode pattern layer 220 is formed in a direction of an Rx axis serving as the horizontal axis in FIG. 3, a first wire is connected to the first sensing electrode pattern layer 220, and a first bonding pad 225 is formed on an end of the first wire. In addition, the first sensing electrode pattern layer 220, the first wire, and the first bonding pad 225 are aligned on the same plane.

A first adhesive insulating layer 230 is formed on the first sensing electrode pattern layer 220. In this case, the first adhesive insulating layer 230 is formed on a region except for the first bonding pad 225.

That is, the first adhesive insulating layer 230 covers the wire of the first sensing electrode pattern layer 220 as well as the first sensing electrode pattern layer 220 to protect the first sensing electrode pattern layer (Rx wire) 220. However, the adhesive insulating layer 230 does not cover the bonding pad 225 so that the first bonding pad 225 is exposed.

In detail, referring to FIG. 3, based on the first sensing electrode pattern layer 220, the first adhesive insulating layer 230 covers all regions of the first sensing electrode pattern layer 200, is formed on the wire of the first sensing electrode pattern layer 220, but is not formed on the first bonding pad 225. Accordingly, the first adhesive insulating layer 230 may be formed on a region except for the first bonding pad 225 to expose the first boding pad 225.

Based on the second sensing electrode pattern layer 240, the first adhesive insulating layer 230 is formed at a region corresponding to the second sensing electrode pattern layer 240, the second wire, and the second bonding pad 245.

A second sensing electrode pattern layer 240 is formed on the first adhesive insulating layer 230. The second sensing electrode pattern layer 240 is formed in a direction of a Tx axis serving as the vertical axis in FIG. 3. In this case, the second wire and a second bonding pad 245 are formed together with the second sensing electrode pattern layer 240. In addition, the second sensing electrode pattern layer 240, the second wire, and the second bonding pad 245 are aligned on the same plane.

A second adhesive insulating layer 250 is formed on the second sensing electrode pattern layer 240. Referring to FIG. 3, the second adhesive insulating layer 250 is disposed on the second sensing electrode pattern layer 240. In this case, the second adhesive insulating layer 250 covers a wire of the second sensing electrode pattern layer 240 but does not cover the second bonding pad 245.

In detail, based on the first sensing electrode pattern layer 220, the second adhesive insulating layer 250 is firmed on remaining regions except for an edge part of the first sensing electrode pattern layer 220, but is not formed at a region corresponding to the wire of the first sensing pattern layer 220 and the first bonding pad 225.

Based on the second sensing electrode pattern layer 240, the second adhesive insulating layer 250 covers all regions of the second sensing electrode pattern layer 240, is formed on the second wire of the second sensing electrode pattern layer 232, but is not formed on the second bonding pad 245. Accordingly, the second adhesive insulating layer 250 may not be formed on the second boding pad 245 to expose the second bonding pad 245.

Accordingly, the first adhesive insulating layer 230 and the second adhesive insulating layer 250 have different areas and may be formed on the first sensing electrode pattern layer 220 and the second sensing electrode pattern layer 240, respectively. In detail, an area of the first adhesive insulating layer 230 may be wider than that of the second adhesive insulating layer 250. That is, a contact area between the first contact insulating layer 230 and the first sensing electrode pattern layer 220 may be wider than that between the second adhesive insulating layer 250 and the second sensing electrode pattern layer 240.

As described above, the first adhesive insulating layer 230 does not cover the first bonding pad 225 and the second adhesive insulating layer 250 does not cover the second bonding pad 245. Accordingly, the touch panel may expose the bonding pads 225 and 245. As a result, a separate patterning process with respect to the first adhesive insulating layer 230 and the second adhesive insulating 240 are not required to expose the bonding pads 225 and 245.

Since the first adhesive insulating layer 230 and the second adhesive insulating layer 250 are formed only in a desired region without covering both of the first sensing electrode pattern layer 220 and the second sensing electrode pattern layer 240 by varying the size of the first adhesive insulating layer 230 and the second adhesive insulating layer 250, a process time and a process cost may be reduced.

Hereinafter, a touch panel according to the second embodiment will be described with reference to FIG. 4. In the following description of a touch panel according to the second embodiment, the description about the elements and structures the same as those of the above description or extremely similar to those of the touch panel according to the first embodiment will be omitted.

Figure 4:
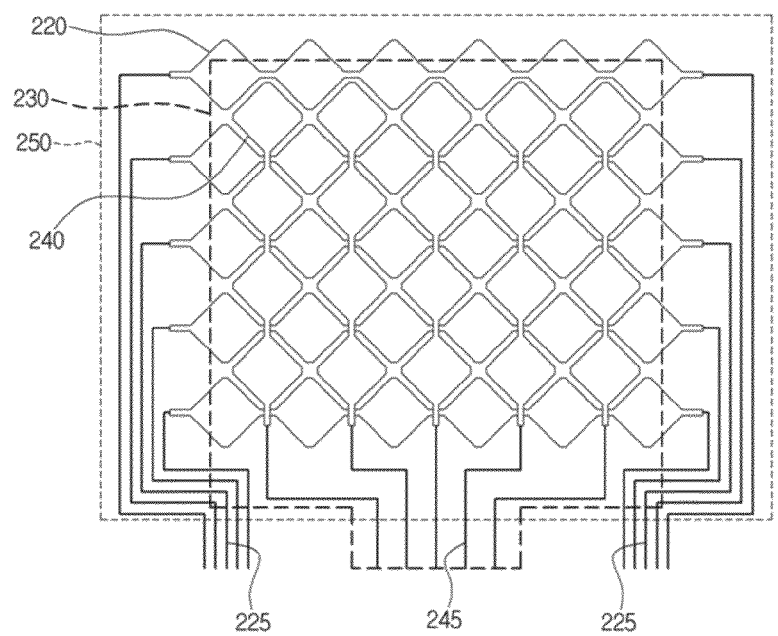
FIG. 4 is a view illustrating a touch panel according to a second embodiment.

FIG. 4 is a view illustrating a touch panel according to the second embodiment.

Referring FIG. 4, in the touch panel according to the second embodiment, a first adhesive insulating layer 230 is formed on the first sensing electrode pattern layer 220, and the second sensing electrode pattern layer 240 is formed on the first adhesive insulating layer 230. The second adhesive insulating layer 250 is formed on the second sensing electrode pattern layer 240. The first sensing electrode pattern layer 220 is formed in a direction of an Rx axis serving as the horizontal axis in FIG. 4, a wire is connected to the first sensing electrode pattern layer 220, and the first bonding pad 225 is formed on an end of the wire.

The first adhesive insulating layer 230 is formed on the first sensing electrode pattern layer 220. The first adhesive insulating layer 230 covers the first sensing electrode pattern layer 220. The first adhesive insulating layer 230 is formed at a region corresponding to the second sensing electrode pattern layer 240, the wire of the second sensing electrode pattern layer 232, and the second bonding pad 245.

In detail, based on the first sensing electrode pattern layer 220, the first adhesive insulating layer 230 covers the entire region except for an edge part of the first sensing electrode pattern layer 220, but is not formed on the wire of the first sensing electrode pattern layer 220 and the first bonding pad 225. Accordingly, the first adhesive insulating layer 250 may not be formed on the first bonding pad 225 to expose the first boding pad 225.

In addition, based on the second sensing electrode pattern layer 240, the first adhesive insulating layer 230 is formed at a region corresponding to the second sensing electrode pattern layer 240, the second wire of the second sensing electrode pattern layer 232, and the second bonding pad 245.

The second sensing electrode pattern layer 240 is formed in a direction of a Tx axis serving as the vertical axis in FIG. 4. The wire and the second bonding pad 245 are formed together with the second sensing electrode pattern layer 240.

The second adhesive insulating layer 250 is formed on the second sensing electrode pattern layer 240. The second adhesive insulating layer 250 is formed on a region except for the second bonding pad 245.

In detail, based on the first sensing electrode pattern layer 220, the second adhesive insulating layer 250 is formed at a region corresponding to all regions of the first sensing electrode pattern layer 220 and a region corresponding to the wire of the first sensing electrode pattern layer 220, but is not formed at a region corresponding to the first bonding pad 225.

Based on the second sensing electrode pattern layer 240, the second adhesive insulating layer 250 covers all regions of the second sensing electrode pattern layer 240 and is formed on the wire of the second sensing electrode pattern layer 232, but is not formed on the second bonding pad 245. Accordingly, the second adhesive insulating layer 250 may not be formed on the second bonding pad 245 so that the second bonding pad 245 can be exposed.

Accordingly, the first adhesive insulating layer 230 and the second adhesive insulating layer 250 have different areas and may be formed on the first sensing electrode pattern layer 220 and the second sensing electrode pattern layer 240, respectively. In detail, an area of the second adhesive insulating layer 250 may be wider than that of the first adhesive insulating layer 230. That is, a contact area between the first contact insulating layer 230 and the first sensing electrode pattern layer 220 may be wider than that between the first adhesive insulating layer 230 and the first sensing electrode pattern layer 220.

As described above, the first adhesive insulating layer 230 does not cover the first bonding pad 225 and the second adhesive insulating layer 250 does not cover the second bonding pad 245. Accordingly, the touch panel may expose the bonding pads 225 and 245. As a result, a separate patterning process with respect to the first adhesive insulating layer 230 and the second adhesive insulating 240 are not required to expose the bonding pads 225 and 245.

Since the first adhesive insulating layer 230 and the second adhesive insulating layer 250 are formed only in a desired region without covering both of the first sensing electrode pattern layer 220 and the second sensing electrode pattern layer 240 by varying the size of the first adhesive insulating layer 230 and the second adhesive insulating layer 250, a process time and a process cost may be reduced.

Figure 5:
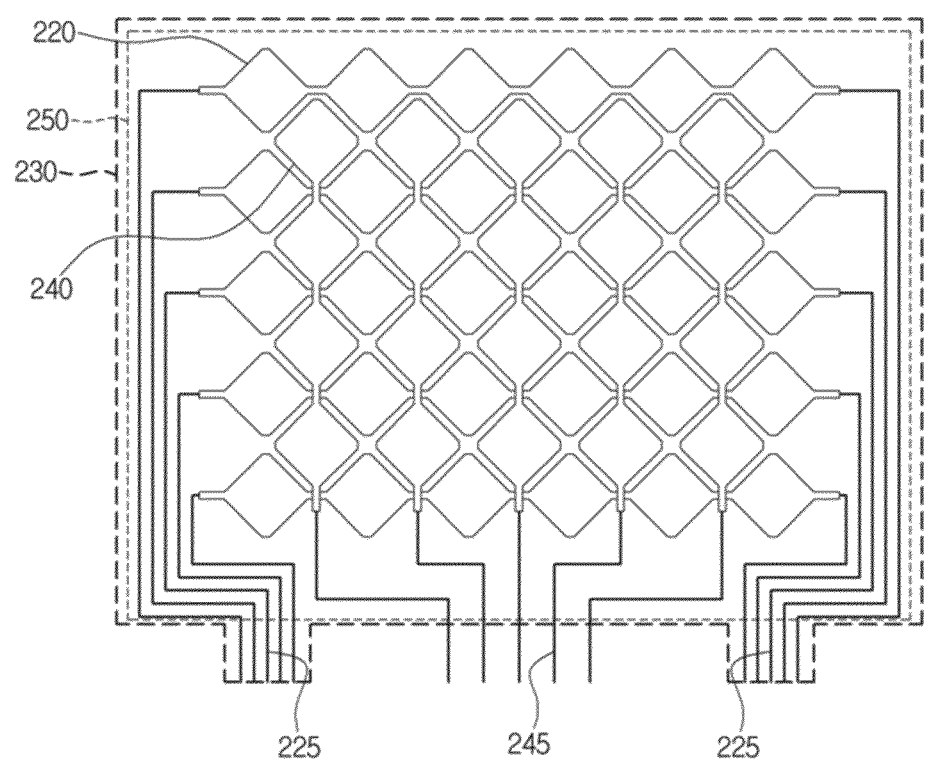
FIG. 5 is a view illustrating a touch panel according to a third embodiment.

FIG. 5 is a view illustrating a touch panel according to the third embodiment.

Referring to FIG. 5, according to the third embodiment, the first adhesive insulating layer 230 is formed on the first sensing electrode pattern layer 220, the second sensing electrode pattern layer 240 is formed on the first adhesive insulating layer 230, and the second adhesive insulating layer 250 is formed on the second sensing electrode pattern layer 240.

According to the touch panel of the third embodiment, the first sensing electrode pattern layer 220 is formed in a direction of an Rx axis serving as the horizontal axis in FIG. 5, a wire is connected to the first sensing electrode pattern layer 220, and the first bonding pad 225 is formed on an end of the wire.

The first adhesive insulating layer 230 and the second adhesive insulating layer 250 are formed on a region except for the first bonding pad 225 or the second bonding pad 245.

For example, the first adhesive insulating layer 230 is formed on the first sensing electrode pattern layer 220. The first adhesive insulating layer 230 is disposed on the entire region except for the second bonding pad 245.

In detail, based on the first sensing electrode pattern layer 220, the first adhesive insulating layer 230 covers all regions of the first sensing electrode pattern layer 220 and is formed on the wire of the first sensing electrode pattern layer 220 and the first bonding pad 225. However, the embodiment is not limited thereto. That is, when the second adhesive insulating layer 250 is formed on the second bonding pad 245, the first adhesive insulating layer may not be formed on the first bonding pad 225.

Based on the second sensing electrode pattern layer 240, the first adhesive insulating layer 230 is formed at a region corresponding to the second sensing electrode pattern layer 240 and a region corresponding to the wire of the second sensing electrode pattern layer 232, but is not formed at a region corresponding to the second bonding pad 245.

A second sensing electrode pattern layer 240 is formed on the first adhesive insulating layer 230 disposed as above. The second sensing electrode pattern layer 240 is formed in a direction of a Tx axis serving as the vertical axis in FIG. 5, and the wire and the second bonding pad 245 are formed together with the second sensing electrode pattern layer 240.

The second adhesive insulating layer 250 is formed on the second sensing electrode pattern layer 240 formed as above.

The second adhesive insulating layer 250 may be disposed on remaining regions except for the first bonding pad 225 and the second bonding pad 245.

In detail, based on the first sensing electrode pattern layer 220, the second adhesive insulating layer 250 covers all regions of the first sensing electrode pattern layer 220, and is formed at a region corresponding to the wire of the first sensing electrode pattern layer 220, but is not formed at a region corresponding to the first bonding pad 225. In addition, based on the second sensing electrode pattern layer 240, the second adhesive insulating layer 250 is formed at a region corresponding to the second sensing electrode pattern layer 240 and on the wire of the second sensing electrode pattern layer 232, but is not formed at a part where the second bonding pad 245 is disposed. Accordingly, the second adhesive insulating layer 250 may not be formed on the second bonding pad 245 to expose the second bonding pad 245. However, the embodiment is not limited thereto. That is, when the first adhesive insulating layer 230 is not funned on the first bonding pad 245, the second adhesive insulating layer 250 may be formed on the second bonding pad 245.

Accordingly, the first adhesive insulating layer 230 and the second adhesive insulating layer 250 have different areas and may be formed on the first sensing electrode pattern layer 220 and the second sensing electrode pattern layer 240, respectively. In detail, in the third embodiment, an area of the first adhesive insulating layer 230 may be wider than that of the second adhesive insulating layer 250. That is, a contact area between the first contact insulating layer 230 and the first sensing electrode pattern layer 220 may be wider than that between the second adhesive insulating layer 250 and the second sensing electrode pattern layer 240.

As described above, if the first adhesive insulating layer 230 and the second adhesive insulating layer 250 do not cover the first bonding pad 225 or the second bonding pad 245, a separate patterning process with respect to the first adhesive insulating layer 230 or the second adhesive insulating layer 250 for exposing the first bonding pad 225 or the second bonding pad 250 is not required.

Accordingly, according to the embodiment, since the adhesive insulating layer is not formed at the bonding pad connected to the wire of the sensing electrode, a separate patterning process for exposing the boding pad can be omitted.

Since the first adhesive insulating layer 230 and the second adhesive insulating layer 250 are formed only in a desired region without covering both of the first sensing electrode pattern layer 220 and the second sensing electrode pattern layer 240 by varying the size of the first adhesive insulating layer 230 and the second adhesive insulating layer 250, a process time and a process cost may be reduced.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch panel comprising:
   a first sensing electrode pattern layer on a top surface of a transparent substrate;
   a first wire connected to the first sensing electrode pattern layer, wherein the first wire and the first sensing electrode pattern layer are aligned in a first plane parallel to the top surface of the transparent substrate;
   a first bonding pad formed at an end of the first wire and connected to a flexible printed circuit board (FPCB), wherein the first bonding pad is aligned with the first wire and the first sensing electrode pattern in the first plane;
   a first adhesive insulating layer on the first sensing electrode pattern layer;
   a second sensing electrode pattern layer on the first adhesive insulating layer;
   a second wire connected to the second sensing electrode pattern layer, wherein the second wire and the second sensing electrode pattern layer are aligned in a second plane parallel to the top surface of the transparent substrate;
   a second bonding pad formed at an end of the second wire and connected to the FPCB, wherein the second bonding pad is aligned with the second wire and the second sensing electrode pattern in the second plane; and
   a second adhesive insulating layer on the second sensing electrode pattern layer,
   wherein the first adhesive insulating layer contacts at least a portion of the first sensing electrode pattern layer, wherein the second adhesive insulating layer contacts at least a portion of the second sensing electrode pattern layer, and wherein an area of the first adhesive insulating layer is different from an area of the second adhesive insulating layer.

2. The touch panel of claim 1, wherein the first adhesive insulating layer is formed on the first sensing electrode pattern layer and the first wire but not on the first bonding pad, and wherein the second adhesive insulating layer is formed on the second sensing electrode pattern layer and the second wire but not on the second bonding pad.

3. The touch panel of claim 2, wherein the first adhesive insulating layer is formed at a region corresponding to the second sensing electrode pattern layer, the second wire, and the second bonding pad, and the second adhesive insulating layer is formed at a region corresponding to the first sensing electrode pattern layer.

4. The touch panel of claim 1, wherein the first adhesive insulating layer is formed at a region corresponding to the second sensing electrode pattern layer, the second wire, and the second bonding pad, and the second adhesive insulating layer is formed at a region corresponding to the first sensing electrode pattern layer and the first wire.

5. The touch panel of claim 1, wherein the first adhesive insulating layer is not formed on the first bonding pad and the second adhesive insulating layer is not formed on the second bonding pad.

6. The touch panel of claim 1, wherein the first adhesive insulating layer is formed on the first wire, and the second adhesive insulating layer is formed on the second wire.

7. The touch panel of claim 6, wherein the first adhesive insulating layer is formed at a region corresponding to the second sensing electrode pattern layer and the second wire, and the second adhesive insulating layer is formed corresponding to the first sensing electrode pattern layer and the first wire.

* * * * *